United States Patent [19]

Doering et al.

[11] Patent Number: 4,470,083
[45] Date of Patent: Sep. 4, 1984

[54] MAGNETIC RECORDING DISK CARTRIDGE

[75] Inventors: Arlin B. Doering, South St. Paul; Terrance D. Lindberg, Stillwater, both of Minn.

[73] Assignee: Minnesota Mining and Manufacturing Company, Saint Paul, Minn.

[21] Appl. No.: 556,607

[22] Filed: Nov. 30, 1983

[51] Int. Cl.³ .................. G11B 5/012; G11B 5/10; G11B 5/12; G11B 5/41
[52] U.S. Cl. ................................. 360/97; 360/128; 360/137
[58] Field of Search .......... 360/97, 137, 128, 133, 360/135, 60, 66, 98, 99; 428/900; 264/109, 115, 128; 206/444

[56] References Cited

U.S. PATENT DOCUMENTS

| 4,354,213 | 10/1982 | Martinelli | 360/128 |
| 4,358,801 | 11/1982 | Faber | 360/97 |
| 4,374,404 | 2/1983 | Davis | 360/128 |
| 4,385,335 | 5/1983 | Kiemer | 360/137 |
| 4,412,260 | 10/1983 | Stricklin | 360/97 |
| 4,419,164 | 12/1983 | Martinelli | 360/128 |

FOREIGN PATENT DOCUMENTS

| 77566 | 4/1983 | European Pat. Off. . |
| 85983 | 8/1983 | European Pat. Off. . |
| 3232327 | 3/1983 | Fed. Rep. of Germany . |
| 2100048 | 12/1982 | United Kingdom . |
| 2103862 | 2/1983 | United Kingdom . |
| 2108309 | 5/1983 | United Kingdom . |

Primary Examiner—Robert Martin Kilgore
Attorney, Agent, or Firm—D. M. Sell; J. A. Smith; D. B. Little

[57] ABSTRACT

An improved design for a compact floppy disk cartridge is provided in which the wiping fabric is prevented from moving and causing stringers out the head access window. This is accomplished by providing ribs on both halves of the cartridge case which, together with raised peripheral edges on the case, provide an irregular shape. The wiping fabric is cut to a shape which conforms with the outline provided by the combination of ribs and peripheral edges. Thus, the wiping fabric is keyed into the space defined by the ribs and peripheral edges.

Other improvements embodied in this design are: a compression return spring for a sliding shutter which is substantially completely covered by the shutter (thus preventing debris from interfering with the spring); and temporary interference fit closure of the cartridge shells to permit non-destructive testing.

8 Claims, 6 Drawing Figures

MAGNETIC RECORDING DISK CARTRIDGE

TECHNICAL FIELD

This invention is in the field of magnetic recording media disks which are contained in a case or cartridge. The recording medium itself is generally a circular disk made of flexible magnetic sheet material. The assembly comprising a recording medium disk in a case is designated by various names in the literature such as microfloppy disk, floppy disk, compact floppy disk or cassette. For purposes of this discussion, the complete assembly, including the recording medium disk and the case will be referred to as a diskette. Also, throughout this discussion, the term cartridge will be used to refer to the case into which the magnetic recording medium disk fits.

BACKGROUND

Flexible magnetic disks now in use in word processing and personal computer applications are usually contained in a flexible jacket formed with an approximately rectangular opening as a head access window and also with a center opening for engagement of the disk with the disk drive. It is possible for dust or foreign matter to enter the flexible plastic jacket containing the magnetic recording disk through these openings and be deposited on the recording medium. Also, when such diskettes are held by the fingers at the head access opening, fingerprints can be formed on the surface of the recording medium. The magnetic recording medium is also exposed to mechanical damage through the head access window. On recording media disks with high information density, dust, fingerprints or mechanical damage can be serious problems causing dropouts to occur in signals reproduced from the magnetic recording medium. Therefore, it has been necessary to handle diskettes with great care.

There is currently a trend toward making recording media smaller in size (i.e., 3-4 inch diameter disks as opposed to the 5¼ and 8 inch diameter disks currently in use). The smaller diskettes have the advantage that they are very easily transported, even in a shirt or coat pocket. However, this advantage may lead to increased exposure to contaminants. The smaller size diskettes, because of their convenience, may be used in a broad range of applications ranging from computer terminals in factories to home computers.

The opportunity for the occurrence of the above-described types of damage should be minimized. There are existing designs to provide protection to diskettes. In general, these provide a case which is more rigid or durable than the traditional floppy disk cases, and they provide a shutter to keep dust and foreign matter from entering the case through the head access windows. Like the previously known diskettes, the newer versions usually provide wiping fabric or cleaning sheets often made of non-woven material adhered to the inside of both halves of the jacket or cartridge to wipe any debris from the recording medium disk as it rotates.

The use of a shutter mechanism allows the head access windows to be open when the diskette is loaded into a disk drive, and to be covered when the assembly is not in a drive, thus preventing fingers from touching the recording medium. There are several shutter designs in the patent literature, and usually the shutter is actuated by a spring which keeps it in the closed position when not in use. When the diskette is inserted into a drive, the shutter in some designs is automatically opened by some external force, such as by engagement of a shutter actuating tab with a part of the disk drive housing. One such design has a compression spring located in the edge of the cartridge where it is engaged by a tang on a sliding shutter. In this particular location, a substantial portion of the total length of the compression spring is exposed to dirt and dust.

Prior art three to four inch diameter diskettes have a wiping fabric which is in an annular shape, having a space cut out of the annulus for the head access hole. One problem related to the wiping fabric which can occur is the formation of protrusions or stringers of the wiping fabric into the head access hole. These stringers can come between the recording medium and the recording or read head, interfering with the record or playback process.

DISCLOSURE OF THE INVENTION

This invention presents a new cartridge design which embodies several improved features. The invention is summarized as a magnetic recording disk cartridge, having a central opening for receiving a drive shaft of a recording/reproducing apparatus and at least one opening for receiving a magnetic recording head, said cartridge comprising a pair of shells:

at least one of which has peripheral raised edges intended to be in facing relationship to the peripheral edges of the other shell in the assembled cartridge; and both shells having ribs, which define a portion of the space to be occupied by a wiping fabric, said space having an irregular shape which does not permit rotational or sliding movement of a wiping fabric having a shape which registers with the outline formed by the ribs when the fabric is laid flat.

Although it is possible to make the inventive cartridges with raised peripheral edges on one shell only, the edges on the other shell being flat, it is preferred to have raised peripheral edges on both shells. The ribs on each shell would then connect with the raised peripheral edges to form an outline that defines the space to be occupied by the wiping fabric.

The completely assembled diskette includes wiping fabric bonded into, and in register with the above-described space in both shells.

Also, the completely assembled diskette made with the above-described cartridge may include a sliding shutter held slidably on the cartridge. The invention provides an improvement in shutter design over the design discussed in the background section in that a compression spring is placed in a channel formed near the edge of the cartridge and directly underneath the sliding shutter. With this design, substantially all of the spring is covered by the shutter and thus remains free from exposure to contaminants which might become entrapped in the spring, affecting its performance.

A completely assembled diskette having a cartridge embodying the above features (including as well a magnetic recording medium disk) is within the scope of this invention.

The ribs on the inside of the cartridge provide for radial orientation of the wiping fabric. As one example of a wiping fabric useful in this invention, the annular shaped piece described in the background section is modified to have a key or roughly rectangular shaped protrusion on the outside. This key fits inside a keyway formed by the ribs and peripheral edges of the shell (see FIG. 2). The key on the wiping fabric, once fitted within the keyway, prevents rotation of the fabric, and the specific shape of the wiping fabric piece defines one and only one location for the fabric in the shell. Shifting of the fabric is prevented, thus alleviating the potential for any misalignment at the head access hole leading to the formation of stringers.

DETAILED DESCRIPTION

Figure 1:
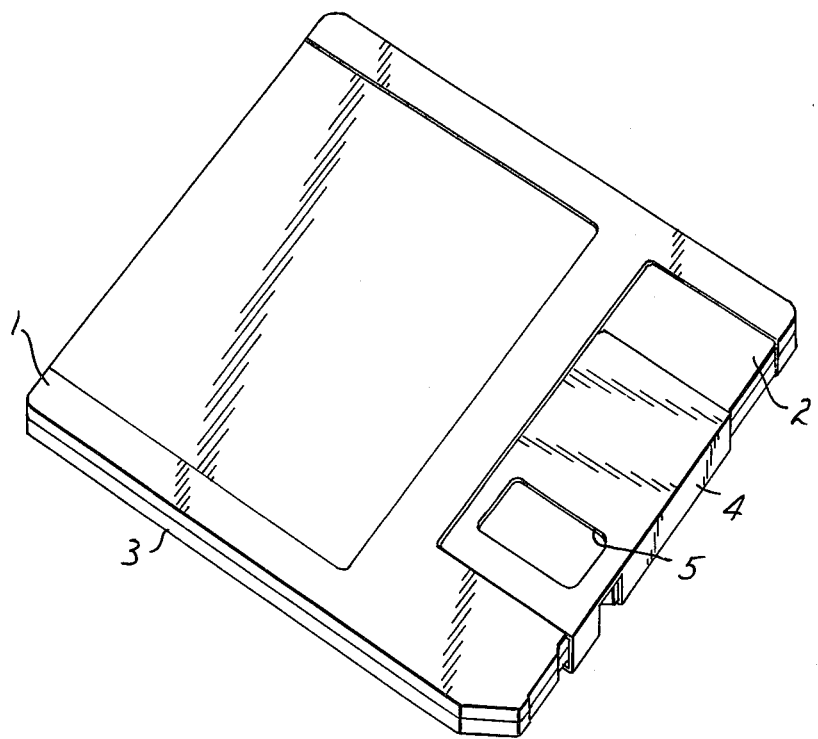
FIG. 1 is a pictorial view of an assembled diskette of this invention.

Referring to the figures, FIG. 1 shows one example of a completely assembled diskette of the present invention. The basic elements are: the first shell 1 shown on top, a recess 2 in that shell for receiving the shutter 4 which has head access windows 5 (one on opposite side of shutter not shown), and the second shell designated as number 3. The shell halves 1 and 3 may be made of a variety of synthetic resinous materials such as polyvinyl chloride, polystyrene, polycarbonate, polyester modified polypropylene oxide (e.g. Noryl resin from General Electric Company) or acrylonitrile-butadiene-styrene resins.

Figure 2:
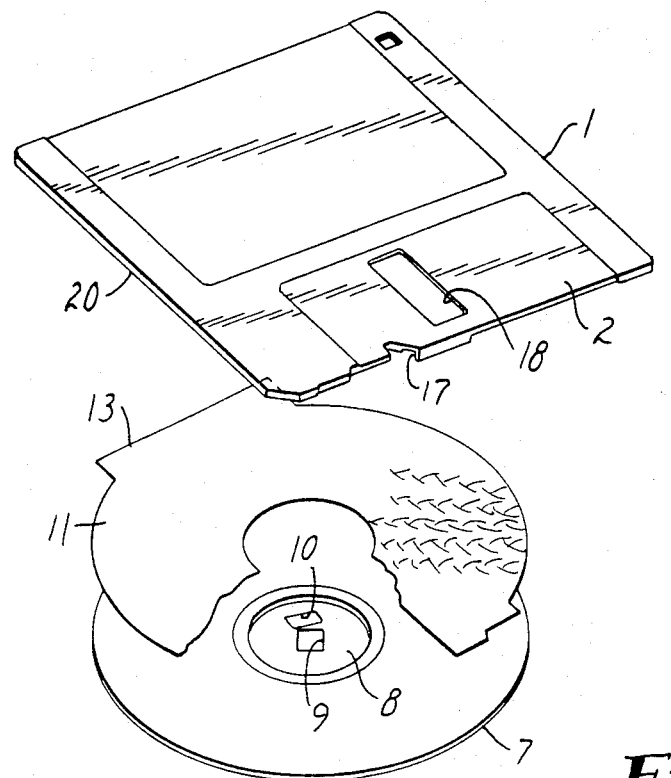
FIG. 2 is an exploded view of a diskette of this invention showing the component parts.
Figure 2:
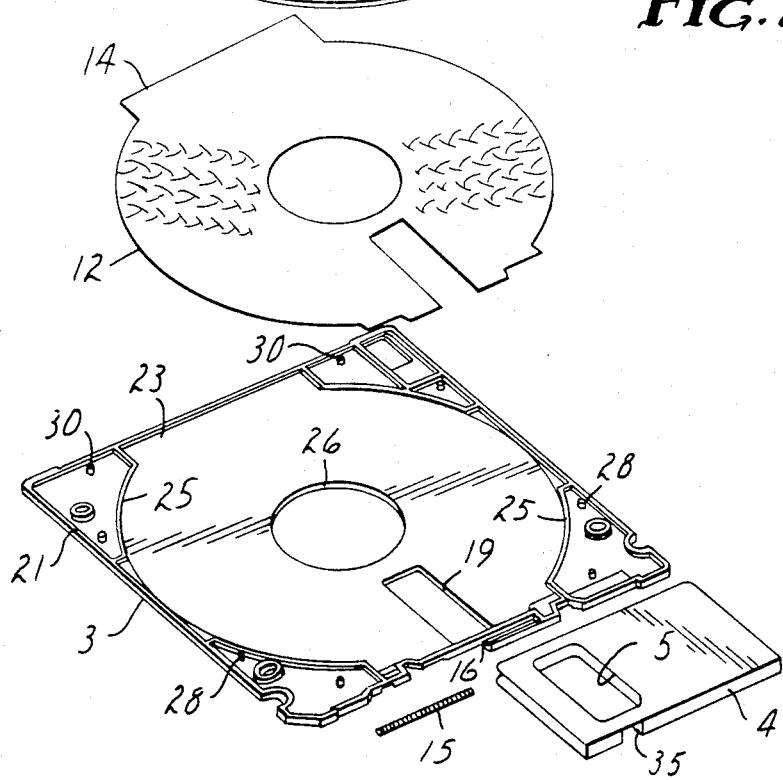

The exploded view in FIG. 2 shows how the component parts of the inventive diskette fit together. First shell 1 has head access window 18 which aligns with the similar window 19 in the second shell 3 when the two shells have been joined to form the completed cartridge. The raised peripheral edges 20 on shell 1 are on the inside surface of the first shell and mate or register with the similar raised peripheral edges 21 on the second shell. The ribs 25 on the second shell 3 connect with the raised peripheral edges 21 on that shell, and the outline formed by the combination of the ribs and raised peripheral edges defines the shape of the wiping fabric 12 to be inserted in the resulting space and bonded to the second shell. A key 14 on the wiping fabric 12 fits into keyway 23 which is part of the shape of the space formed by the ribs 25 and raised peripheral edges 21. A similar relationship exists between ribs 24 (shown in FIG. 3) in the first shell, raised edges 20 and wiping fabric 11 having key 13.

Recording medium disk 7 fits in between the first and second shells in the assembled cartridge and is wiped by the wiping fabric pieces 11 and 12 as it rotates. The recording medium disk has in its center a hub 8 formed with a hole 9 for receiving the drive shaft of a disk drive which is inserted through the central aperture 26 in second shell 3. The other hole 10 in hub 8 is for a position regulating pin which extends from the disk drive. Other hub designs are feasible, and the design shown is intended to be exemplary of the feasible designs and not limiting.

The shutter actuating spring 15 fits into the partially closed channel formed by channels 16 in the second shell and 17 (shown in FIG. 3) in the first shell when the two shells are joined to form the cartridge. The way in which channels 16 and 17 mate to form the partially closed channel is best shown in FIG. 4. In the completely assembled diskette, the spring is substantially completely covered by shutter 4. A typical spring constant for spring 15 is 0.2 pounds force/inch (0.037 N/mm). The shutter itself is typically made of a non-magnetic material such as 302 stainless steel.

The cartridge shells may be formed with certain indexing windows (for indexing the recording head), positioning holes (for positioning the cartridge in the disk drive), and a protection feature (sometimes called a write protect feature). The protection feature usually comprises an aperture or notch in the cartridge which interacts with some mechanical, electro-mechanical or light-sensing actuator in the drive mechanism to protect data which is stored on the magnetic recording medium disk. For example, a write protect feature could be designed such that when the write-protect aperture is open, the drive will not record on the disk; while it can record on the disk when the aperture of the protection feature has been closed, for example by moving a tab or slide.

Figure 3:
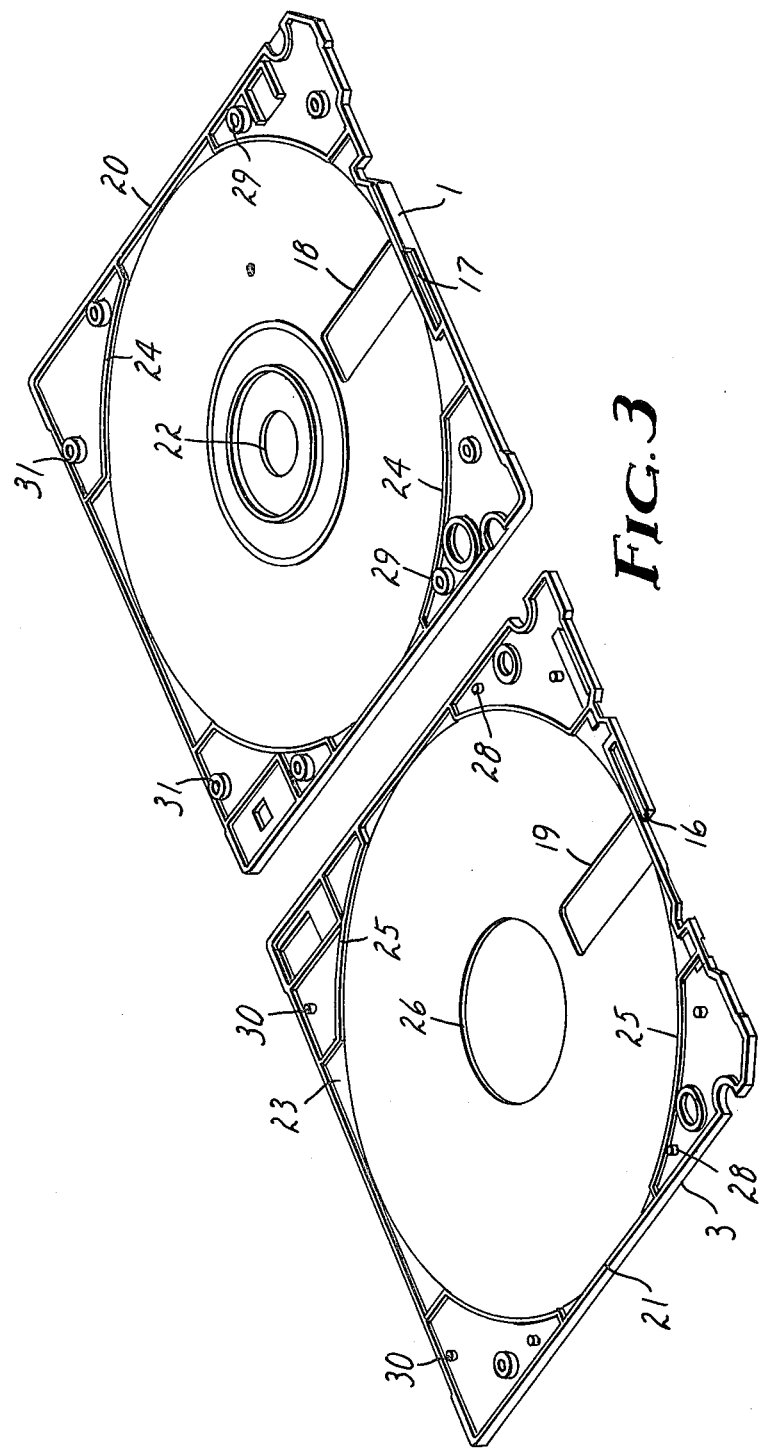
FIG. 3 presents a perspective view of the inside of both shells of the inventive cartridge. For the sake of convenience, the shell on the right hand side of FIG. 3 (also on the top of FIG. 1) is consistently called the first shell hereinafter, and the shell on the left hand side of FIG. 3 (bottom of FIG. 1) is referred to as the second shell. Also, for the sake of convenience, the side of each shell facing the magnetic recording disk in the assembled diskette is referred to as the inside of the shell, and the opposite side of each shell is referred to as the outside.
Figure 4:
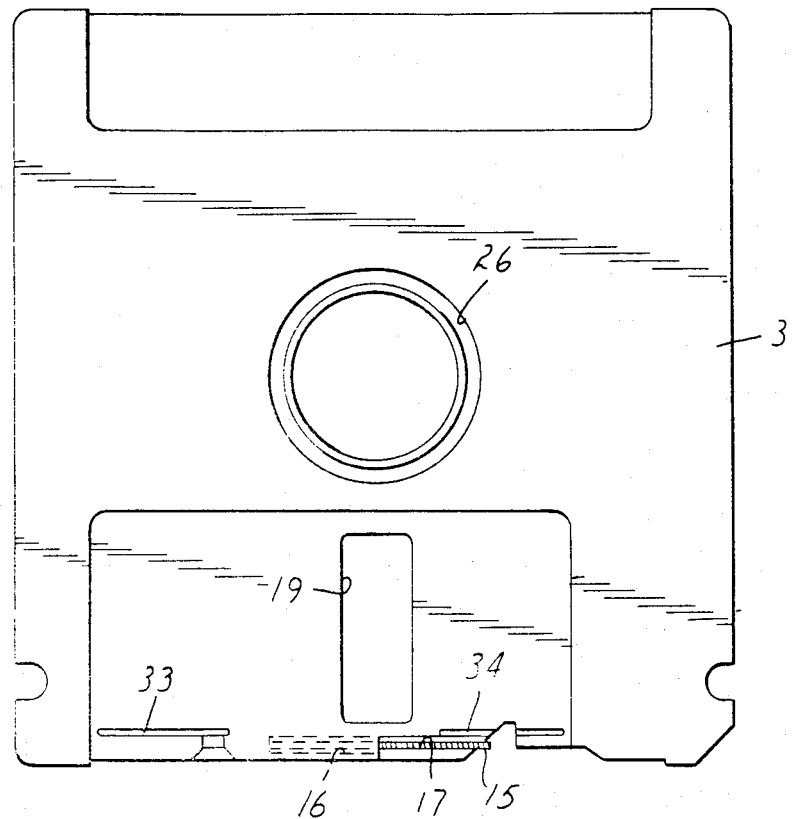
FIG. 4 depicts a plan view of the outside of the cartridge, looking down on the second shell without the shutter installed.

In the layout of FIG. 3, a means of joining the two cartridge shells can be seen. Several posts 28 and 30 on second shell 3 are designed to be inserted in wells 29 and 31 molded into first shell 1. After being received in the well, the plastic posts are bonded to the plastic of the wells by a process such as ultrasonic welding. The joining of the two shells could also be accomplished by simply applying adhesive to the raised peripheral edges.

An additional improvement of this invention is a method for temporary joining of the cartridge shells by a press fit or interference fit of one or more of the posts and wells for purposes of testing. In such an improvement, for example, posts 30 and wells 31 are designed to make a press or interference fit by suitable dimensional control, well known in the art. The posts 30 are made in a tapered shape having a diameter at some point greater than the inside diameter of wells 31, so that they would fit snuggly when pressed into the wells. With the cartridge temporarily joined by this press-fitting method, electronic tests can be conducted on the magnetic recording medium disk 7. If the tests indicate the product is within specification, the shells are then joined permanently by ultrasonic welding or another technique. If, on the other hand, the magnetic recording medium does not meet specification, the shells can be easily separated by pulling apart the posts and wells which had been joined by interference fitting, and a new recording medium disk inserted. Thus, the diskette can be non-destructively tested resulting in a savings of the shell materials.

The design shown in FIG. 3 has another advantage. All of the posts and wells for the attachment of the first and second shells are located in corner spaces which have been effectively segregated from the space to be occupied by the wiping fabric and magnetic recording medium. This segregation has been accomplished by the specialized shape of the combination of the ribs and raised peripheral edges. With this design, any debris which results from the bonding of the posts into the wells is kept away from the space to be occupied by the magnetic recording medium.

When the drive shaft enters hub aperture 9 it may extend through the aperture with the top of the drive shaft entering recess 22 in the first shell. In order to eliminate wear on the first shell and also to minimize drag on the drive shaft, a low friction plate (e.g., a small disk of Teflon tetrafluoroethylene polymer) may be fitted into recess 22 in the first shell.

A flexible sheet may be attached to the inside of one of the shells in the area to be covered by one of the wiping fabrics. Such a flexible sheet is typically made of a plastic and is adhered at one end to the shell while the other end is bent at an angle away from the inside shell surface. With the wiping fabric installed over the flexible sheet in the completed diskette, the flexible sheet aids in its cleaning function since the bent portion presses the fabric against the magnetic recording medium.

Figure 5:
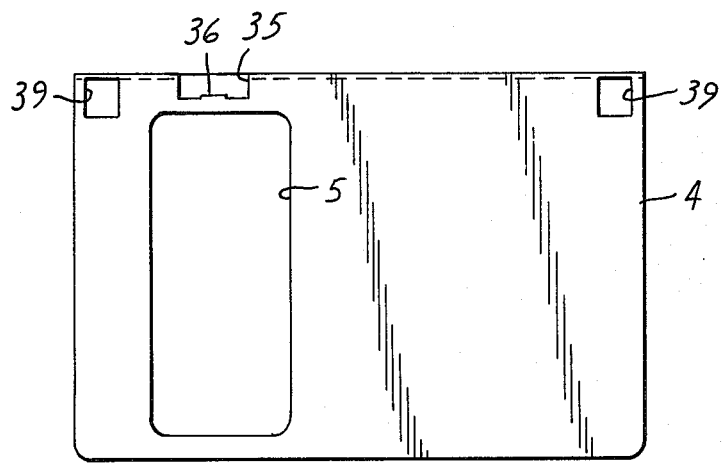
FIG. 5 shows a plan view of the shutter.
Figure 6:
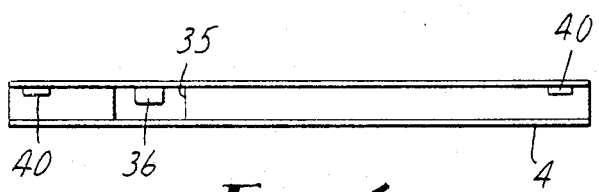
FIG. 6 shows a side view of the shutter.

The way in which the shutter fits onto the cartridge can be seen by studying FIGS. 4, 5 and 6. Tangs 40 which are formed as an integral part of the shutter 4 engage and slide within slots 33 and 34. Tang 36, which is also formed as an integral part of the shutter, fits within the channel 17 and engages one end of spring 15, the other end of which rests against the end of the partially closed channel formed by channels 16 and 17. Apertures 39 are formed in the shutter when tangs 40 are made by bending part of the shutter material inward. Aperture 35 is formed in the shutter when tang 36 is made by bending part of the shutter material inward. These apertures aid in seeing if the tangs are inserted into the appropriate slots and channel.

Spring 15 is preferably designed to be pre-loaded, that is to exert some force against tang 36 when the shutter is in the fully closed position. This prevents rattling of the shutter. Therefore, the spring is designed to be slightly longer in its fully relaxed state than the space available for it between the channel end and tang 36. Because of this, the spring must be slightly compressed during the installation of the shutter on the cartridge. One method for compressing the spring is to place a thin rod through aperture 35 and in front of tang 36 to retract the spring and allow tang 36 to be inserted into channel 17. The rod is withdrawn when the shutter installation is complete at which point the spring is pressing against tang 36.

Thus, when a force is exerted to slide the shutter back and compress spring 15, the head access windows 5 of the shutter 4 align with the head access windows of the first and second shells 18 and 19 to expose the magnetic recording medium disk 7. On the other hand, with no such force applied to the shutter, the spring expands pushing against tang 36 and causing the shutter to slide into the closed position. Tangs 40 sliding within slots 33 and 34 guide the shutter 4 in this movement.

The diskettes of this invention may be made by the following process steps:
1. The first and second shells are molded in a typical plastic molding process, and the molded parts are cleaned.
2. The wiping fabric is placed in the appropriate spaces in the first and second shells and bonded thereto by any one of a variety of techniques such as thermal bonding or through the use of adhesives.
3. A recording medium disk with a hub is installed in the second shell.
4. The first shell is installed on the second shell.
5. The spring is inserted into the partially closed channel formed by channels 16 and 17, and the shutter is installed on the assembled cartridge.
6. The electromagnetic characteristics of the magnetic recording medium may be measured at this point to see if it meets the specification.
7. The bonding process is carried out to join the two cartridge shells permanently.

While certain representative embodiments and details have been discussed above for the purpose of illustrating the invention, it will be apparent to those skilled in this art that various changes and modifications may be made in this invention without departing from its true spirit or scope which is indicated by the following claims.

What is claimed is:

1. A magnetic recording disk cartridge having a central opening for receiving a drive shaft of a recording or reproducing apparatus and at least one opening for receiving a magnetic recording head, said cartridge comprising a pair of shells:
   at least one of which has peripheral raised edges in facing relationship to the peripheral edges of the other shell in the assembled cartridge; and
   both shells having ribs which define at least a portion of the space to be occupied by a wiping fabric, said space having an irregular shape which does not permit rotational or sliding movement of a wiping fabric having a shape which registers with the outline formed by the ribs when the wiping fabric is laid flat.

2. The magnetic recording disk cartridge of claim 1 in which:
   each shell has peripheral raised edges in facing relationship to the peripheral raised edges of the other shell in the assembled cartridge;
   the ribs on each shell connect to the peripheral raised edges; and
   the outline formed by the combination of the ribs and peripheral raised edges defines the space to be occupied by the wiping fabric.

3. The magnetic recording disk cartridge of claim 1 wherein the irregular shape of the space to be occupied by the wiping fabric is approximately a circular shape having a keyway.

4. The magnetic recording disk cartridge of claim 1 which further comprises a wiping fabric within each shell, said wiping fabric having a shape which conforms to the outline of the ribs.

5. The magnetic recording disk cartridge of claim 4 which further comprises a sliding shutter which is held slidably on the cartridge and which engages and covers substantially all of a spring which maintains the shutter in a normally closed position.

6. The magnetic recording disk cartridge of claim 5 wherein the spring is a compression spring which is pre-loaded to exert sufficient force to prevent rattling of the shutter in its normally closed position.

7. A diskette comprising the cartridge of claim 4 and a magnetic recording medium which is contained therein between the two wiping fabrics.

8. The magnetic recording disk cartridge of claim 1 having a temporary closure means comprising at least one post in one of the shells and at least one well in the other shell designed to receive the post in an interference fit.

* * * * *